United States Patent Office 2,964,555
Patented Dec. 13, 1960

2,964,555

2-BENZOYL-5-METHOXYPHENYL BENZOATE AND ITS PROCESS OF PRODUCTION

Robert L. Hudson, Midland, Mich., assignor to The Dow Chemical Company, Midland, Mich., a corporation of Delaware No Drawing. Filed Sept. 22, 1958, Ser. No. 762,220

2 Claims. (Cl. 260—476)

The present invention is directed to 2-benzoyl-5-methoxyphenyl benzoate, corresponding to the formula

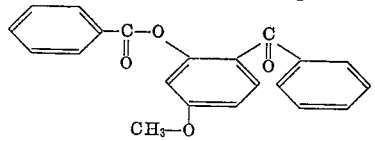

and with a novel method for its preparation. This compound is a crystalline solid soluble in many common organic solvents such as chlorinated hydrocarbons, acetone, and lower alkanols; and of very limited solubility in water. It is useful for the control of insects, such as cockroaches and houseflies, and as a herbicide.

The novel compound may be prepared by reacting resorcinol dimethyl ether and benzoyl chloride in the presence of a catalyst, such as zinc chloride. Conveniently, the reaction may be carried out in an inert liquid reaction medium, such as tetrachloroethane. Good results are obtained when employing approximately 2 molecular proportions of benzyl chloride reactant for each molecular proportion of resorcinol dimethyl ether. The catalyst may be employed in a catalytic amount, such as, for example, ½ mole percent. The reaction is mildly exothermic and takes place readily from 50° C. to 200° C., preferably at temperatures of from 100° to 200° C., conveniently at the boiling temperature of the liquid reaction medium.

In carrying out the reaction, the reactants are intimately mixed and blended together, with liquid reaction medium if employed, and the resulting reaction mixture is heated with stirring at the desired reaction temperature range. Heating and stirring are thereafter continued for a period of time to assure completion of the reaction. Upon completion of the reaction, the liquid reaction medium, which may be a reaction solvent, is removed by vaporization, and the desired product thereafter separated from the residue in known manners. In one such manner, the residue may be distilled under vacuum to separate the desired 2-benzoyl-5-methoxyphenyl benzoate.

The following example illustrates the invention but is not to be considered as limiting it.

*Example*

Resorcinol dimethyl ether (69 grams; 0.5 mole), 156 grams (1.1 moles) of benzoyl chloride, and 0.4 gram of freshly fused zinc chloride were dispersed, and intimately mixed and blended, in 150 milliliters of tetrachloroethane as reaction solvent, and the resulting reaction mixture was heated under reflux and at the boiling temperature (approximately 132° C.) for 40 hours to carry the reaction to completion. Thereafter, reflux was discontinued, the tetrachloroethane reaction medium was removed by vaporization, and the resulting residue distilled at increasing temperatures and under gradually decreasing subatmospheric pressure. A main product fraction was collected at the boiling temperature of 217° C. under 0.08 millimeter pressure. This fraction was recrystallized from tetrachloroethylene to obtain a white crystalline solid, 2-benzoyl-5-methoxyphenyl benzoate product, melting at 96–97° C.

The present compound is useful as a fungicide, and is especially adapted to be employed in the control of intestinal parasites of warm blooded animals. For such use, the unmodified compound may be employed. In alternative procedures, the compound may be dispersed upon an inert finely divided solid and the resulting preparation employed as a dust. For oral administration, such preparation may be employed as a feed additive, enclosed in a capsule, or compressed to form a bolus. Also, such preparation may be dispersed in water with or without a wetting agent and the resulting aqueous dispersions may be employed as oral drenches or in drinking water. In other procedures the compounds may be employed in oil or as a constituent of oil-in-water or water-in-oil emulsions or as aqueous dispersions thereof which may be applied as spray, drench, or wash. In a representative operation the feeding in unrestricted quantity of a balanced commercial laboratory animal diet modified by the inclusion therein of 2-benzyl-5-methoxyphenyl benzoate in concentration of 0.25 percent by weight over a period of 7 days to mice parasitized by *Ascaris lumbricoides suum* gave a 100 percent kill of the parasites without evident injury to the mice.

Various modifications of the process and products of the present invention may be made without departing from the spirit or scope thereof, and it is to be understood that I limit myself only as defined in the appended claims.

I claim:

1. 2-benzoyl-5-methoxyphenyl benzoate.
2. A method of preparing 2-benzoyl-5-methoxyphenyl benzoate which comprises reacting, in the presence of zinc chloride and at a temperature of from 50° C. to 200° C., 2 molecular proportions of benzoyl chloride and 1 molecular proportion of resorcinol dimethyl ether.

References Cited in the file of this patent

Amin et al.: J. Indian Chem. Soc., 25, 378–9 (1948).
Van Allen et al.: J. Org. Chem., 19, 1243–4 (1954).